Patented June 25, 1940

2,205,995

UNITED STATES PATENT OFFICE 2,205,995

PRODUCTION OF AMINO CARBOXYLIC ACID NITRILES

Heinrich Ulrich and Ernst Ploetz, Ludwigshafen-on-the-Rhine, Germany, assignors to I. G. Farbenindustrie Aktiengesellschaft, Frankfort-on-the-Main, Germany No Drawing. Application January 11, 1938, Serial No. 184,380. In Germany January 20, 1937

12 Claims. (Cl. 260—464)

The present invention relates to improvements in the production of amino carboxylic acid nitriles.

It has already been proposed to prepare aminocarboxylic acid nitriles by the action of aldehydes or ketones and hydrocyanic acid on salts of amines.

We have now found that aminocarboxylic acid nitriles can be obtained in a very simple and advantageous manner by acting on salts of ammonia substances containing at least one hydrogen atom directly attached to the nitrogen, i. e. ammonia or primary or secondary mono- or poly-amines, with carbonyl compounds (i. e. aldehydes or ketones) and also with hydrocyanic acid which is produced in the reaction vessel itself. The production of the hydrocyanic acid in the reaction vessel itself is advantageously effected by using ammonium or amine salt solutions containing an excess of acid, and allowing a solution of a cyanide to flow into the mixture of the said acid salt solutions with aldehydes or ketones. The hydrocyanic acid formed is for the greater part immediately reacted.

Amine salt solutions and aldehydes or ketones may also be brought into the reaction vessel without an excess of acid or with only a slight excess of acid, cyanide solution and acid being allowed to flow in at the same time. It is advantageous to work while mixing well, as for example by stirring.

Instead of or in addition to ammonium salts, such for example as ammonium sulphate, there may also be used the sulphates, phosphates, hydrochlorides, formates or acetates of methylamine, dimethylamine, propylamine, dodecylamine, octodecylamine, octodecenylamine, aniline, ethylene diamine, phenylene diamine, and triethylene tetramine. In the case of diamine or polyamines, at least one primary or secondary amino group must be contained in the molecule. Substitution products of amines, for example amines containing halogen or hydroxyl, ether, —SO₃H or —OSO₃H groups, such as chlorethylamine, mono- or di-ethanolamine, aminodiglycol, α-amino-glycerine, 1,2-diamino-3-hydroxy propane, monoethanol amine sulphuric acid ester, taurine and diaminodiethylether, may also be used. As suitable aldehydes or ketones there may be mentioned formaldehyde, acetaldehyde, crotonaldehyde, benzaldehyde, acetone, methyl ethyl ketone, acetophenone and benzophenone.

The hydrocyanic acid may be produced in the reaction chamber by the action of sodium, potassium, calcium or like cyanide and sulphuric acid, phosphoric acid, hydrochloric acid or other acid.

Although it is necessary to work in an acid medium, the reaction takes place in a smooth manner with good yields, whereby the danger attending the poisonous nature of hydrocyanic acid is greatly reduced.

The following examples will further illustrate how the said invention may be carried out in practice, but the invention is not restricted to these examples. The parts are by weight.

Example 1

66 parts of ammonium sulphate are dissolved in 300 parts of 30 per cent formaldehyde and mixed in a closed vessel with 200 parts of concentrated hydrochloric acid while cooling. While cooling and stirring, 450 parts of 34 per cent sodium cyanide solution are allowed to flow into the resulting solution. The temperature of the reaction mixture is kept at 40° C. for 20 hours and at 60° C. for a further 20 hours. After the said time, the reaction is practically completed. By filtration by suction and washing, well-crystallized aminotriacetonitrile is obtained.

Example 2

80 parts of 75 per cent ethylene diamine are mixed with 400 parts of 30 per cent formaldehyde and 700 parts of 50 per cent sulphuric acid. While stirring and cooling, 600 parts of 34 per cent sodium cyanide solution are allowed to flow in and the temperature of the reaction mixture is kept at 40° C. for 24 hours. The ethylene diamino tetra-acetonitrile formed may be directly isolated by filtration by suction.

Equivalent amounts of calcium or potassium cyanide may be used instead of sodium cyanide.

Example 3

400 parts of 30 per cent formaldehyde solution, 350 parts of concentrated sulphuric acid and 670 parts of 30 per cent sodium cyanide solution are added one after the other to a 50 per cent solution of 90 parts of 1,3-diamino-2-hydroxypropane, the temperature being prevented from rising above 20° C. by cooling. The mixture is stirred for some hours at room temperature and then heated for 2 hours at 90° C. in order to complete the reaction. After cooling the reaction product is filtered off by suction. It is 1,3-tetra-aceto-nitrile-diamino-2-hydroxypropane corresponding to the formula

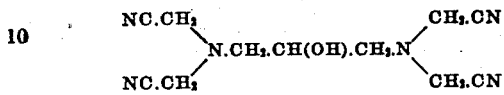

Example 4

303 parts of diethylene triamine are mixed with 1500 parts of 30 per cent formaldehyde while cooling. 1050 parts of concentrated sulphuric acid and then 2250 parts of 34 per cent sodium cyanide solution are added to the said mixture. After stirring for several hours the reaction product separates out. It is penta-acetonitrile-diethylenetriamine corresponding to the formula

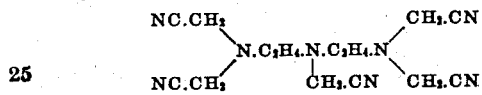

Example 5

200 parts of 30 per cent formaldehyde solution, then 150 parts of concentrated sulphuric acid and finally 300 parts of 33 per cent sodium cyanide solution are added to 116 parts of chlorethylamine hydrochloride. After stirring for from about 12 to about 15 hours chlorethyl-diacetonitrile-amine corresponding to the formula

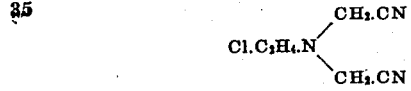

separates out.

What we claim is:

1. The process of producing aminocarboxylic acid nitriles, which comprises causing a salt of an ammonia substance selected from the class consisting of ammonia and primary and secondary mono- and polyamines to react with a carbonyl compound selected from the class consisting of aldehydes and ketones and hydrocyanic acid, which latter is produced within the reaction chamber.

2. The process of producing aminocarboxylic acid nitriles, which comprises causing a salt of an ammonia substance selected from the class consisting of ammonia and primary and secondary mono- and polyamines to react with a carbonyl compound selected from the class consisting of aldehydes and ketones and hydrocyanic acid, which latter is produced within the reaction chamber by causing a solution of a cyanide and an acid to react with one another in the reaction chamber.

3. The process of producing aminocarboxylic acid nitriles, which comprises causing a salt of an ammonia substance selected from the class consisting of ammonia and primary and secondary mono- and polyamines to react with a carbonyl compound selected from the class consisting of aldehydes and ketones and hydrocyanic acid, which latter is produced within the reaction chamber by causing a solution of a cyanide and an acid to flow into the reaction chamber.

4. The process of producing aminocarboxylic acid nitriles, which comprises causing a solution of a salt of an ammonia substance selected from the class consisting of ammonia and primary and secondary mono- and polyamines, which solution contains an excess of acid, to react with a carbonyl compound selected from the class consisting of aldehydes and ketones and hydrocyanic acid which latter is produced within the reaction chamber by causing a solution of a cyanide to flow in the reaction chamber into the first mentioned solution containing an excess of acid.

5. The process of producing aminocarboxylic acid nitriles, which comprises causing a solution of a salt of ammonia to react with an aldehyde and hydrocyanic acid, which latter is produced within the reaction chamber.

6. The process of producing aminocarboxylic acid nitriles, which comprises causing a solution of a salt of ethylene diamine to react with an aldehyde and hydrocyanic acid, which latter is produced within the reaction chamber.

7. The process of producing aminocarboxylic acid nitriles, which comprises causing a salt of ammonia to react with formaldehyde and hydrocyanic acid, which latter is produced within the reaction chamber.

8. The process of producing aminocarboxylic acid nitriles, which comprises causing a salt of a polyamine to react with a formaldehyde and hydrocyanic acid, which latter is produced within the reaction chamber.

9. The process of producing aminocarboxylic acid nitriles, which comprises causing a salt of ethylene diamine to react with a formaldehyde and hydrocyanic acid, which latter is produced within the reaction chamber.

10. The compound corresponding to the formula

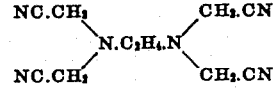

11. The compound corresponding to the formula

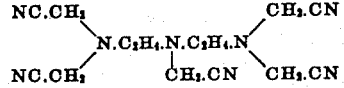

12. Tertiary amino carboxylic acid nitriles which contain from two to three amino nitrogen atoms being joined to each other by alkylene groups and being substituted by nitrile groups leaving no free hydrogen atoms on the amino nitrogen atoms, the said nitrile group being attached to the amino nitrogen atoms by means of alkylene groups.

HEINRICH ULRICH.
ERNST PLOETZ.